Aug. 19, 1969     L. L. SMITH     3,461,629
SHUTTER STRUCTURE
Filed Oct. 20, 1967
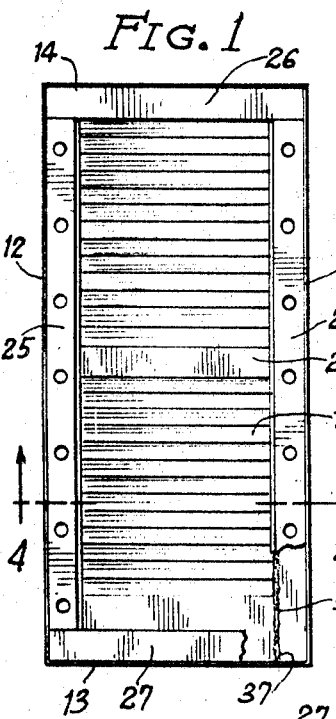
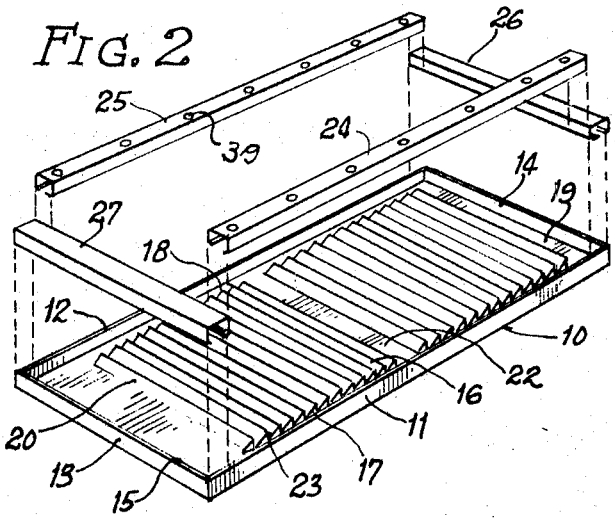
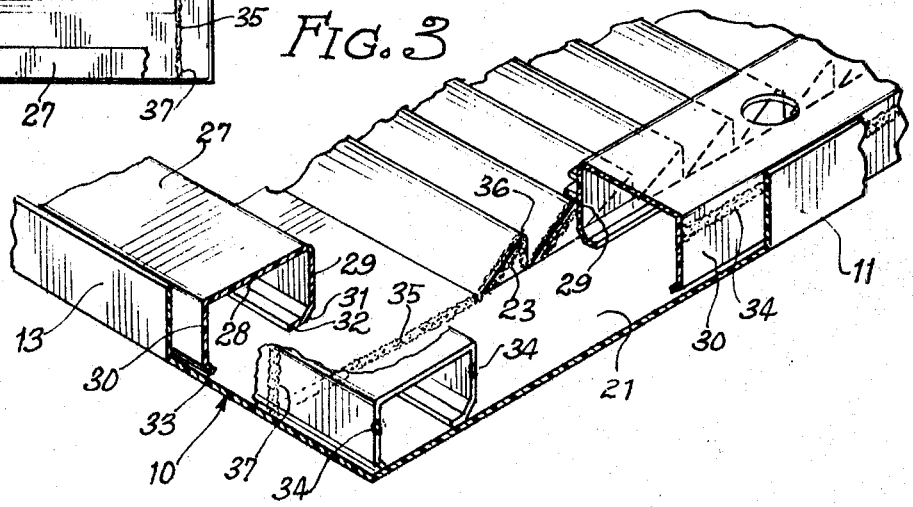
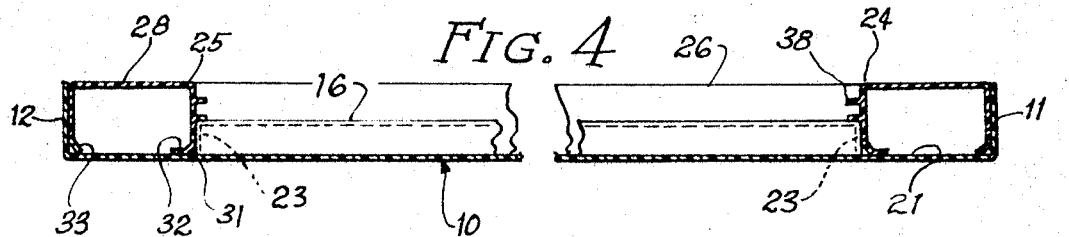
INVENTOR
Lester L. Smith
by Horton, Davis, Brewer
and Brugman Att'ys

United States Patent Office 3,461,629
Patented Aug. 19, 1969

3,461,629
SHUTTER STRUCTURE
Lester L. Smith, Peoria, Ill. (% Home Comfort Products Co., P.O. Box 68, Princeville, Ill. 61559)
Filed Oct. 20, 1967, Ser. No. 676,869
Int. Cl. E04g 9/00
U.S. Cl. 52—314                              6 Claims

ABSTRACT OF THE DISCLOSURE

An ornamental shutter made from a thin sheet of molded plastic material stiffened by channel-sectioned members arranged in the form of a rectangular frame and cemented to the sheet rather than to one another by easily applied parallel beads of appropriate cement.

BACKGROUND OF INVENTION

This invention relates to partitions and will be described with reference to ornamental window shutters which may be affixed to a wall of a building adjacent the sides of a window or the like in a permanent position.

Shutters are frequently applied to buildings on both sides of windows for purely ornamental purposes, with no intention that they be hinged to swing over the window. Such ornamental shutters are therefore fastened to the building in a permanent fashion and are not moved except perhaps to paint the building wall behind them. Since such shutters are not used for their ordinary functions, they may be constructed of a single sheet of molded material which is formed to resemble a rectangular wooden frame having horizontal inclined slats. The material is preferably a permanently colored plastic impervious to moisture, hail and temperature variations which thus requires little periodic maintenance.

A plastic sheet formed to resemble a shutter is not, however, inherently rigid enough to retain its shape under high wind and other pressures. Furthermore, the corners are subject to abuse during shipping and are likely to crack or break as a result. To stiffen such sheet and to strengthen the corners thereof, it has been proposed to adhere the sheet to a wooden frame, but because of the difference in rate of thermal expansion between the plastic material and the wooden frame, such combined plastic and wood shutters warped and separated and hence have not been successful. Making the sheet of sufficiently thick plastic material to render it stiff and strong increases the cost of the shutter prohibitively.

SUMMARY OF INVENTION

The object of this invention is to provide a partition made from a relatively thin sheet of plastic material which will withstand the normal stresses imposed during shipping, and be rigid under normal conditions of installation, which will withstand variations in temperature as well as other weather conditions to which it may be exposed, and which will be inexpensive to make.

A specific object of this invention is the provision of a partition made from a relatively thin sheet of plastic material the sides and ends of which are continuous and extend transversely to the general plane of the sheet, with molded channel-shaped members cemented to the sides and other regions of the sheet in a manner to form box girder type stiffening members for the partition.

As a more specific object, this invention has within its purview the provision of stiffening members for a plastic sheet of material formed to resemble a shutter, wherein the form and placement of the stiffening members makes possible the cementing of the members to the sheet with a single, substantially straight-line motion of cement applicators, and with the use of a minimum amount of cement.

In the preferred form selected to illustrate this invention, the partition is made to resemble a wooden shutter for a window. To this end, the front face and the top, bottom and both sides are made from a single sheet of acrylonitrile butadiene styrene polymer molded to give the appearance of a wooden rectangular frame, with or without a centrally located mullion and with horizontally disposed corrugations resembling slats extending between the sides of the frame. The obverse side of the sheet has the appearance of a shallow rectangular pan the sides of the frame being formed by portions of the sheet extending transversely of the general plane of the sheet and being unbroken around the periphery of the sheet.

Such a sheet can be readily distorted out of a generally flat plane and hence must be stiffened to eliminate distortion. The stiffening is accomplished by forming plastic channel members of the approximate size of the simulated wooden frame and cementing said channel members to the sheet with the open side of the channel facing the sheet, thus producing a box girder construction.

The cement used is an epoxy cement and may be applied to the sheet in two pairs of beads, one bead of each pair being laid continuously along the inside edge of each side of the sheet and the other bead of each pair being laid along the sheet and the inside of the top and bottom of the sheet in a straight line which crosses the top and bottom channel members. The beads are thus parallel and substantially straight, making for an easy application thereof. The top and bottom members cross both pairs of beads and are cemented to the sheet as are also the two side members, and a rigid assembly results.

In the drawings, which show a preferred form of the invention

FIG. 1 is a rear elevational view of the finished shutter with a portion of one corner cut away;

FIG. 2 is an exploded perspective view of the shutter of FIG. 1;

FIG. 3 is an enlarged perspective view of a corner of the shutter with portions cut away; and FIG. 4 is an enlarged sectional view of the shutter of FIG. 1 looking in the direction of the arrows 4—4 thereof.

As shown in FIG. 2, the shutter of this invention is formed most economically as a single rectangular sheet 10 of molded polymer, the specific material used being preferably acrylonitrile butadiene styrene which may be colored in any of the popular shutter colors. Said sheet 10 has formed as an integral part thereof a continuous peripheral flange which provides the sides 11 and 12, and ends 13 and 14 of the finished shutter. As initially molded, the free edge 15 of the flange may be uneven and may require trimming before the shutter is completely assembled and cemented together. The width of the flange, i.e., of the sides 11, 12 and ends 13, 14 is however, at least equal to the desired thickness of the shutter.

The central region of the sheet 10 is formed with parallel corrugations 16, made to resemble the inclined louvers or slats of a shutter. Thus the ends 17 and 18 of the corrugations are aligned and spaced inwardly of the sides 11 and 12 of the sheet, and the top and bottom slats 19 and 20 are similarly spaced from the upper and lower ends 14 and 13, respectively, of the sheet. The peripheral space 21 between the corrugations and the flange resembles, on the obverse or exposed side of the sheet, a rectangular frame such as is commonly used in the construction of wooden shutters. If it is desired to simulate a central mullion on the exposed side as a part of the apparent rectangular frame, the corrugations are eliminated therefrom as shown at 22.

The corrugations have closed ends 23 which provide additional stiffness for the corrugations as well as enhance the appearance thereof. Ends 23 are generally aligned with one another and are parallel to the sides 11 and 12. The corrugations also have a functional significance in the assembly of the sheet with other members of the shutter, as will hereinafter appear.

Sheet 10 as formed, has stiffness about a longitudinal axis passing through the corrugations 16 and the ends 13 and 14, but considerably less stiffness about an axis passing transversely through the mullion-forming portion 22. It can also be twisted to various degrees about axes intermediate the longitudinal and transverse axes. Such flexibility is undesirable, and although it can be minimized by increasing the thickness of the sheet 10, the added cost of so doing is prohibitive.

According to the present invention, adequate rigidity is provided for sheet 10 by cementing thereto in a unique manner, four channel-shaped sections shown at 24, 25, 26 and 27. These sections may be identical in cross-sectional shape and dimensions and may be formed as extruded or other wise molded lengths of acrylonitrile butadiene styrene which are cut to appropriate lengths. Sections 24 and 25 form the sides of a rectangular frame, and sections 26 and 27 form the top and bottom of said rectangular frame. The thickness of the material of the sections may be slightly greater than the thickness of the material of sheet 10. In the form chosen to illustrate this invention top and bottom sections 26 and 27 extend fully across the interior of the sheet side 11 to side 12, and sections 24 and 25 extend between sections 26 and 27 in abutting relation thereto when said sections 26 and 27 are placed against ends 14 and 13, respectively, of sheet 10. It is understood, however, that other arrangements of the sections may be used if desired.

Each channel is formed with a web 28 (FIGS. 3 and 4) and sides 29, 30 extending transversely therefrom. The inner side 29, as viewed in FIG. 3, terminates in a beveled corner 31, which in turn has a short flange 32 extending inwardly therefrom substantially parallel with web 28. The outer side 30 terminates in a beveled corner 33. Said beveled corners 31 and 33 accommodate an internal radius at the corners formed between the sheet and its sides, ends and slats that may be required for the molding thereof, and in addition, they provide additional stiffness to the sides and to the sections as a whole. It may be noted that the side sections 24 and 25 fit snugly between the ends 23 of the corrugations and the sides 11 and 12.

In the assembly of the channel sections with the sheet 10, either a welding process or a cementing process may be used. For purposes of illustration the cementing process will be disclosed and particularly one in which a low solvent epoxy cement is used. Such cement minimizes the migration thereof through the sheet and the possible resultant discoloration of the front face of the shutter. The said epoxy cement forms an extremely strong weld of the sections to the sheet so that relatively little quantity of the cement is necessary to effect a satisfacory weld. Thus it is not necessary that large areas of the abutting sections and sheet be treated with the cement and hence I have found that the channels can be assembled with the sheet with the ends of the sides, rather than the web, in contact with the sheet, as might otherwise appear to be necessary, and that by doing so, a stronger, more rigid box section results. It may therefore be noted from FIGS. 3 and 4, that ends 32 and 33 of each section are in contact with sheet 10 and that web 28 is exposed and substantially coplanar with the edges of sides 11, 12 and ends 13, 14.

The cement is applied to sheet 10 in two pairs of parallel beads, one of which beads is shown at 34 in FIG. 3 and the other bead is shown at 35. Bead 34 is applied along the entire length of each side 11 and 12, so that side 30 of the section is firmly adhered to side 11 of the sheet near the web 28. Furthermore, said bead 34 contacts the ends of channel sides 29 and 30 of the end sections 26 and 27 and serves to secure said end sections to the sheet sides 11 and 12.

The other bead 35 of cement is applied to the corners 36 of the corrugations, along sheet 10 and then along the inside surfaces of ends 13 and 14 as shown at 37 in FIG. 3. The cement of this bead flows down the closed ends 23 of the corrugations 16, which abut upon the side 29 of the side channel sections and bonds said sides and corrugations together. It bonds the short flange 32 of the top and bottom channel sections 26 and 27 to the sheet, and then, through the portion thereof applied at 37 to the sheet ends 13 and 14, bonds said top and bottom sections to ends 13 and 14 of the sheet.

The resulting combination of box structure and strategically located bonds between the channel sections and sheet forms a rigid, light-weight and durable shutter which is inexpensive to make. The channel sections extend into the corners of the sheet to provide reinforcement for such corners. The two parallel beads are applied to the sheet in straight lines, making possible a single motion of the cement applicator which is the simplest for either manual or automatic assembly operation.

As an aid in securing the shutter to a wall, small molded channels 38 (FIG. 4) may be cemented to the inner side 29 of the side channel section 24, 25 in a manner to conact the top of the corrugations 16. The cement applied to the corners 36 of the corrugations also bonds the small channels 38 to the tops of the corrugations and still further rigidifies the shutter.

Although the ends of the sections 24, 25, 26 and 37 are not cemented to the sides of the abutting sections or to the sides 11 and 12, so that build- up of pressure within the sections due to thermal expansion of the air within said sections is relieved, the long side sections 24 and 25 may have large perforations 39 punched or otherwise formed therein to insure against the formation of any pressure differential between the interior and exterior of such sections.

It may be understood that although the foregoing description of the invention refers to shutters, the resulting structure may have other uses, such as doors, dividers, walls and partitions generally, and that the scope of the invention is not to be limited to shutters, but is to be determined by the appended claims.

I claim:

1. A fabricated partition comprising a thin sheet of material formed to have a continuous periphery angularly disposed to the plane of the sheet, stiffening members for the sheet disposed adjacent to and within the confines of said continuous periphery, said stiffening members being generally channel-shaped in cross-section, with the open side of the channel contacting the sheet, said stiffening members being arranged with the end of one member abutting upon the adjacent member, a substantially straight bead of cement disposed between a portion of the periphery of the sheet and the outer side of one member, and a second substantially straight bead of cement disposed between the inner side of said one member, and across the abutting member.

2. A fabricated partition as described in claim 1, said sheet having corrugations formed centrally thereof providing stiffness for said central portion, said sheet being rectangular in outline and said periphery forming side and end surfaces for the partition, said stiffening members lying adjacent said side and end surfaces of said corrugations, said corrugations terminating a distance from said sides, which is substantially equal to the width of said stiffening members adjacent said sides and said bead of cement which is disposed between the sheet and the inner side of said one member extending along the ends of said corrugations to secure the said ends of said corrugations to the inner side of said one member.

3. A fabricated partition as described in claim 1, said corrugations simulating louvers having ends which are substantially parallel with the sides of the sheet and disposed a distance from said sides substantially equal to the width of said stiffening members adjacent said sides, and a flange on said stiffening members adjacent said sides and engaging the peaks of said corrugations, said bead of cement disposed between the sheet and the inner side of said one member extending between the flange and peaks of said corrugations.

4. A fabricated partition as described in claim 1, said sheet being rectangular in outline, said periphery forming paralle side surfaces and parallel end surfaces on said partition, the said one stiffening member which abuts upon the end of one member abutting also upon the end of a member disposed along the opposite parallel side surface, such that said stiffening members form a frame having an end member abutting upon the ends of two parallel side members, and said last-mentioned bead of cement extending under said end member.

5. A fabricated partition as described in claim 4, said sheet having corrugations formed therein simulating louvers having aligned ends which are substantially equidistantly spaced from the sides of the sheet, said corrugations terminating a distance from said sides which is substantially equal to the width of a side member, each side member having a flange extending over and in contact with the corrugations, and said last-mentioned bead of cement extending between the flange and corrugations.

6. A fabricated partition as described in claim 4, the longer of said stiffening members having perforations therein communicating the interior of the channel with the exterior of the partition to prevent the creation of a pressure-differential between the interior and exterior of said longer stiffening members.

References Cited

UNITED STATES PATENTS

| | | | |
|---|---|---|---|
| 982,303 | 1/1911 | Saino et al. | 52—455 |
| 1,363,774 | 12/1920 | Gilmore | 52—455 |
| 1,636,891 | 7/1927 | Barrows | 52—630 |
| 2,260,590 | 10/1941 | Speck | 52—629 |
| 2,451,396 | 10/1948 | Macleod | 52—475 |
| 3,287,854 | 11/1966 | Dasovic et al. | 52—314 |

FRANK L. ABBOTT, Primary Examiner

JAMES L. RIDGILL, Jr., Assistant Examiner

U.S. Cl. X.R.

52—455, 618, 625, 629